Oct. 14, 1924.

F. A. SCHOSSOW

WATER INLET VALVE FOR TANKS

Filed Jan. 28, 1924

1,511,431

Inventor
Frederick A. Schossow

By  S. E. Thomas
Attorney

Patented Oct. 14, 1924.

1,511,431

UNITED STATES PATENT OFFICE.

FREDERICK A. SCHOSSOW, OF DETROIT, MICHIGAN, ASSIGNOR TO MURRAY W. SALES & COMPANY, OF DETROIT, MICHIGAN, A CORPORATION OF MICHIGAN.

WATER INLET VALVE FOR TANKS.

Application filed January 28, 1924. Serial No. 689,012.

*To all whom it may concern:*

Be it known that I, FREDERICK A. SCHOSsow, a citizen of the United States, residing at Detroit, county of Wayne, State of Michigan, have invented a certain new and useful Improvement in Water Inlet Valves for Tanks, and declare the following to be a full, clear, and exact description of the same, such as will enable others skilled in the art to which it pertains to make and use the same, reference being had to the accompanying drawings, which form a part of this specification.

This invention relates to water inlet valves for tanks and particularly to that shown in U. S. Patent No. 1,389,907, dated September 6th, 1921, wherein a yoke-shaped bifurcated fitting supporting the rod of the ball-float and pivoted upon trunnions integral with the valve casing, is also connected with the valve plunger by a transverse screw-threaded pin.

It has been found in practise, however, that the transverse pin which connects the yoke-shaped bifurcated fitting with the valve plunger frequently "works out" rendering the device inoperative; furthermore in some installations it being necessary to install the valve adjacent to the wall of the tank it is difficult, if not impossible to withdraw the pin for the purpose of making repairs without first removing the ball-cock or valve from the tank.

The present invention, therefore, has for its object to overcome these and other objectionable features by providing a U-shaped pin which is adapted not only as a pivot connection between the bifurcated fitting and the plunger but is also adapted to engage the plunger in such manner that the pin cannot become accidentally released but may be readily removed when necessary to make repairs.

It has also been found that the ball-cock in the device referred to is apt to be displaced or thrown out of alignment with other cooperating parts upon "screwing up" or tightening the elements connected therewith; due to the valve turning with the inlet pipe upon which it is mounted.

To overcome this objectionable feature an adjustable transverse pin screwed into a projecting lug formed on the valve casing is provided that it may abut against the wall of the tank to prevent the valve turning with the parts when properly aligned, as a result of the adjustment or screwing up of the elements connected with the water inlet pipe on which the ball-cock is mounted.

It has also been found in practise that the pipe leading from the ball-cock to the usual overflow pipe in the tank is frequently disconnected or loosened to such an extent that it often becomes detached from the casing of the ball-cock as a result of the plumber bending the pipe, thus breaking the joint, upon forcing it to enter the overflow pipe in the tank, after the other parts have been assembled.

It is, therefore, a further object of the present invention to provide the pipe leading to the overflow pipe with a fitting including a nut and screw-threaded collar which is adapted to enter a tapped bore in the valve casing that the pipe may be coupled properly thereto after the other parts of the device are assembled, thus avoiding danger of the pipe becoming separated or displaced through forced adjustment or bending to insure proper connection between the valve and the overflow pipe.

A further object of the invention is to provide the projecting end of the valve plunger with an inverted cup-shaped flange or deflector, adapted to direct any leakage of water occurring between the valve plunger and valve chamber downwardly into the tank.

A further object of the invention is to simplify and improve the general construction of the device.

With the foregoing and other objects in view which will appear as the description proceeds the invention further resides in the combination and arrangement of parts and in details of construction hereinafter described and claimed it being understood that changes may be made in the precise embodiment of the invention herein disclosed without departing from the spirit of the same.

In the drawings accompanying this specification:

Figure 1:
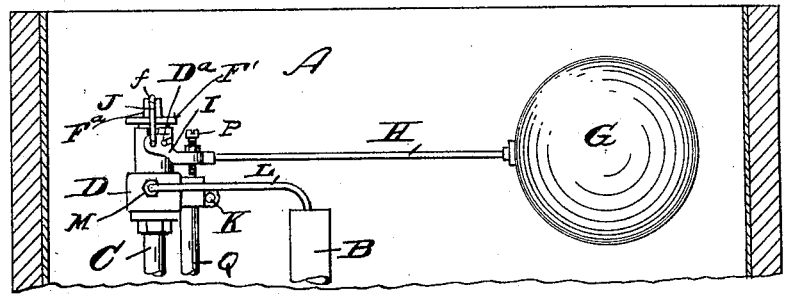
Figure 1 is a side elevation of the ball-cock indicating a fragmentary portion of a flushing tank in section, and showing the connection between the ball-cock and overflow pipe to provide for the usual "after-fill."
Figure 2:
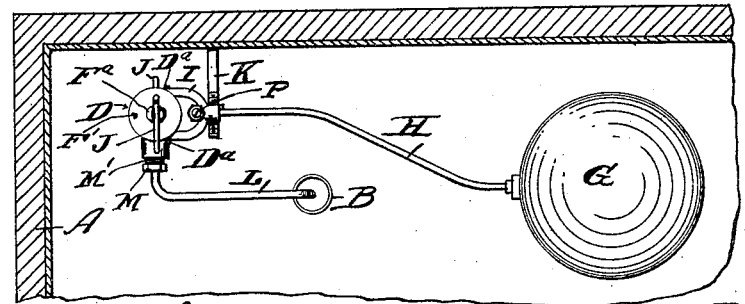
Figure 2 is a horizontal sectional view through a fragmentary portion of a flushing tank showing a plan view of the device and indicating the adjustable transverse pin supported in the lug projecting from the valve to insure the valve against displacement when adjusting the connecting parts.
Figures 3, 4:
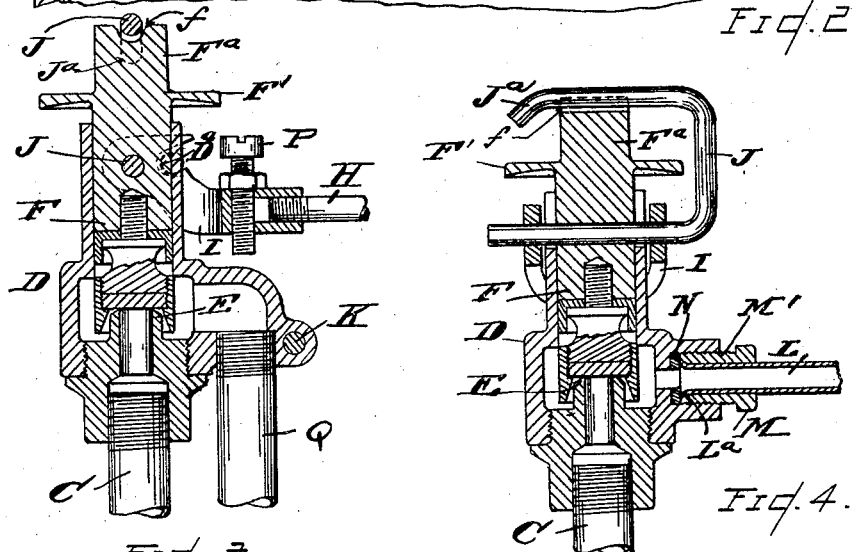
Figure 3 is a vertical sectional view through the ball-cock, as when closed.
Figure 4 is a vertical cross-sectional view through the ball-cock taken at substantially right-angles to that indicated in Figure 3.

Referring now to the letters of reference placed upon the drawings:—

A denotes a flushing tank, B the usual overflow pipe, C a water inlet pipe extending upwardly from the bottom of the tank on which is mounted a water inlet valve chamber or ball-cock D.

E designates the valve seat, which in the present embodiment is an integral part of a fitting, screwed into the valve chamber D, mounted upon the upper end of the inlet pipe.

F, indicates a reciprocating valve plunger, provided with an integral overhanging inverted cup-shaped flange or deflector $F^1$, adapted to direct any leakage of water occurring between the upper edge of the valve chamber and the plunger, downwardly into the tank.

G represents a ball-float mounted on the end of the rod H, in turn supported by a hook-shaped bifurcated fitting I, oscillating upon trunnion $D^a$, integral with the valve body or chamber.

J denotes a transverse pin substantially U-shaped in form extending through a bore in the valve plunger and through the slotted openings in the valve casing to connect the plunger with the bifurcated fitting I. One leg of the U-shaped pin projects upwardly and thence laterally that it may be lodged in a groove $f$, formed in an upper extension $F^a$ of the valve plunger.

To provide against accidental dislodgement of the U-shaped pin connecting the bifurcated fitting with the valve plunger, the upper leg of the pin is bent downwardly as indicated at $J^a$, to prevent any lateral dislodgement.

The U-shaped pin is slightly resilient in order that its upper leg may be manually sprung over the top of the upper extension $F^a$ of the valve plunger that it may enter the groove $f$, provided therein for its reception.

K, designates an adjustable pin extending laterally from a tapped lug $d$ in the valve body that it may be adjusted to abut against the wall of the tank to prevent the fitting from being accidentally turned out of alignment with other cooperating parts of the flushing tank, when screwing or tightening up the parts connected with the inlet pipe;—it being essential that the ball-cock be so placed that the float ball shall be free to rise and fall without danger of contacting with the side walls of the tank.

L, indicates a pipe leading from the ball-cock casing to the overflow pipe B to provide for the usual after-fill.

M, represents a nut having a relatively long screw-threaded collar $M^1$, sleeved on the pipe L, adapted to engage a tapped bore in the wall of the valve casing;—the end of the pipe L "flaring" slightly as at $L^a$, to insure a tight joint between it and the gasket N, lodged in the bore of the fitting. Upon adjusting the nut M the pipe may be securely engaged to the fitting.

It has been customary heretofore to solder or otherwise connect the pipe M with the fitting but it has been found in practise that the joint frequently becomes broken as a result of bending the pipe that it may be coupled with the overflow pipe following the installation of the valve in the tank.

P, indicates an adjustable screw extending through the fitting I adapted to bear upon the wall of the valve chamber to limit the rocking movement of the fitting.

Q, represents a water discharge pipe leading downwardly from an opening in the valve chamber.

Having now indicated the several parts by reference letters the construction and operation of this invention will be readily understood.

To connect the bifurcated fitting with the valve plunger the longer arm of the U-shaped pin is first pushed through the openings provided in the fitting, the slots in the valve chamber and transverse aperture in the valve plunger. The short arm of the pin is then sprung over the top of the plunger into the groove $f$ provided therein to receive it,—the downwardly bent portion of the pin securing it against accidental dislodgement.

To properly assemble the parts within the tank the screw-threaded pin K, is adjusted so that its end will abut against the wall of the tank to maintain the bifurcated fitting with its connecting float rod in proper position to provide for the free up and down movement of the float, the nuts connecting the parts to the tank and to the supply pipe may then be adjusted without danger of the ball-cock being turned so that the central vertical plane passing therethrough will be out of alignment with a plane parallel with the walls of the tank, the pin thus serves as a stop to insure the proper assembly of parts.

The pipe L leading from the ball-cock to the overflow pipe is now connected with the valve chamber by adjusting the nut M so that its collar will bear against the flange formed on the end of the pipe, forcing it into contact with the gasket lodged in the casing.

Having thus described my invention what I claim is:

1. In a device of the character described, a water inlet pipe for a flushing tank, a valve chamber located on the end of said pipe having a discharge opening into the flushing tank, a plunger valve fitted in the valve chamber adapted to seat against the flow of water into the latter, a float lever fulcrumed on trunnions extending from the wall of the valve chamber, and a transverse U-shaped pin having one arm of said pin connecting the valve plunger with the float lever, the other arm of said pin being adapted to enter a groove in the plunger, whereby it may be secured against accidental dislodgement.

2. In a device of the character described, a water inlet pipe for a flushing tank, a valve chamber located upon the end of said pipe having a discharge opening into the flushing tank, a plunger valve fitted in the valve chamber adapted to seat against the flow of water into the latter, a float lever fulcrumed on trunnions integral with the valve chamber, and a U-shaped transverse pin having one arm connecting the valve plunger with the adjacent parts of the float lever, the other arm of said pin entering a groove provided in the end of the plunger, its end bent out of alignment with the body of the arm, whereby accidental dislodgement of said pin may be prevented.

3. In a device of the character described, a water inlet pipe for a flushing tank, a valve chamber located on the end of said pipe having a discharge outlet opening into the flushing tank and an adjustable pin supported in the wall of the valve chamber adapted to bear against the wall of the tank, whereby the valve chamber may be maintained in a predetermined position with reference to the wall of the tank while screwing up the coupling joints connecting the parts leading to the inlet valve.

4. In a device of the character described; a water inlet pipe for a flushing tank; a valve chamber located on the end of the pipe having a discharge outlet opening into the flushing tank; a plunger valve fitted in the valve chamber; a float lever fulcrumed on trunnions integral with the valve chamber; a U-shaped transverse pin, one arm of which connects the valve plunger with the float lever, the other arm of said pin being lodged in a groove in the valve; a pipe adapted to connect the valve chamber with an overflow pipe fitted with a nut having a screw threaded collar engaging the body of the valve, said pipe having a flaring edge to receive the thrust of the collar projecting from said nut and an adjustable pin supported in the wall of the valve chamber adapted to bear against the wall of the tank, whereby said valve may be maintained in a predetermined position with reference to the wall of the tank, while screwing up the coupling joints connecting the parts leading to the inlet valve, whereby a free up and down movement of the float is insured.

5. In a device of the character described; a water inlet pipe for a flushing tank; a valve chamber located upon the end of said pipe; a plunger valve fitted in the valve chamber, provided with an overhanging inverted cup-shaped flange adapted to direct leakage of water between the valve plunger and the valve chamber into the tank; a float lever fulcrumed on trunnions integral with the valve chamber; a U-shaped transverse pin having one arm connecting the valve plunger with the adjacent parts of the float lever, the other arm of said pin engaging the valve, whereby accidental dislodgement of the pin may be prevented, and an adjustable pin supported in the wall of the valve chamber, adapted to bear against the wall of the tank, whereby said valve may be maintained in a predetermined position with reference to the wall of the tank while screwing up the coupling joints connecting the parts leading to the inlet valve.

In testimony whereof, I sign this specification in the presence of two witnesses.

FREDERICK A. SCHOSSOW.

Witnesses:
S. E. THOMAS,
R. V. COON.